United States Patent
Hong et al.

(10) Patent No.: US 12,162,440 B2
(45) Date of Patent: Dec. 10, 2024

(54) WIPER ARM, WIPER AND VEHICLE

(71) Applicant: Valeo Systèmes d'Essuyage, Le Mesnil Saint Denis (FR)

(72) Inventors: Haoyi Hong, Shanghai (CN); Xu Cheng, Shanghai (CN); Jinlong Pu, Shanghai (CN)

(73) Assignee: Valeo Systemes d'Essuyage, La Verriere (FR)

( * ) Notice: Subject to any disclaimer, the term of this patent is extended or adjusted under 35 U.S.C. 154(b) by 0 days.

(21) Appl. No.: 18/271,265

(22) PCT Filed: Jan. 5, 2022

(86) PCT No.: PCT/EP2022/050133
§ 371 (c)(1),
(2) Date: Jul. 7, 2023

(87) PCT Pub. No.: WO2022/148768
PCT Pub. Date: Jul. 14, 2022

(65) Prior Publication Data
US 2024/0067132 A1  Feb. 29, 2024

(30) Foreign Application Priority Data

Jan. 7, 2021  (CN) .......................... 202120031581.0

(51) Int. Cl.
*B60S 1/52*  (2006.01)
*B60S 1/34*  (2006.01)
*B60S 1/40*  (2006.01)

(52) U.S. Cl.
CPC ............. *B60S 1/522* (2013.01); *B60S 1/3415* (2013.01); *B60S 1/4006* (2013.01)

(58) Field of Classification Search
CPC ...... B60S 1/3415; B60S 1/3429; B60S 1/522; B60S 1/524; B60S 1/4006
(Continued)

(56) References Cited

U.S. PATENT DOCUMENTS

| 6,094,772 A * | 8/2000 | West ....................... B60S 1/522 |
| | | 15/250.04 |
| 9,809,199 B2 * | 11/2017 | Burkard .................. B60S 1/522 |
| 2019/0152442 A1 | 5/2019 | Umeno et al. |

FOREIGN PATENT DOCUMENTS

| CN | 212098766 U | 12/2020 |
| FR | 3043969 A1 | 5/2017 |

(Continued)

OTHER PUBLICATIONS

Machine translation of description portion of French publication 3043969, published May 2017. (Year: 2017).*

(Continued)

*Primary Examiner* — Gary K. Graham
(74) *Attorney, Agent, or Firm* — Valeo Systemes d'Essuyage (57) ABSTRACT

The present application relates to a wiper arm, which comprises a wiper arm body and a wiper arm end piece, the wiper arm end piece being fixedly connected to one end of the wiper arm body to hold a wiper blade, the wiper arm being further provided with a nozzle and a hose, wherein the nozzle is connected to an extension section of the wiper arm end piece towards the return side or the outward swing side of the wiper arm; the hose extends along the wiper arm body, and one end of the hose is connected to the nozzle to deliver a cleaning fluid to the nozzle. The arrangement of a nozzle on the wiper arm ensures that a cleaning fluid is quickly wiped off, the driver is given a clear field of vision, and the cleaning fluid usage may also be reduced.

8 Claims, 6 Drawing Sheets

(58) Field of Classification Search
USPC .................................... 15/250.04, 250.351
See application file for complete search history.

(56) References Cited

FOREIGN PATENT DOCUMENTS

| JP | 2017206118 A | 11/2017 |
| JP | 201813445 A | 1/2018 |
| WO | 2016050925 A1 | 4/2016 |

OTHER PUBLICATIONS

Machine translation of description portion of Chinese publication 212098766, published Dec. 2020. (Year: 2020).*
International Search Report and Written Opinion in corresponding International Application No. PCT/EP2022/050133, dated Apr. 11, 2022 (9 pages).
Japan Patent Office, Office Action (with English summary) of corresponding Japanese Patent Application No. 2023-541335, dated May 28, 2024.

\* cited by examiner

WIPER ARM, WIPER AND VEHICLE

TECHNICAL FIELD

The present application relates to the field of mechanical structures, in particular to a wiper arm, a wiper, and a vehicle.

BACKGROUND ART

In a motor vehicle, a wiper is usually installed on the windshield to remove rain or dust that blocks the driver's line of sight, thereby ensuring that the driver is given a clear field of vision.

A conventional wiper is installed independently of a cleaning system, wherein the cleaning system is usually arranged under the bonnet, a cleaning agent is sprayed directly to an upper middle part of the windshield through a nozzle, and consequently, before the wiper wipes the cleaning agent off, the driver cannot see clearly the road conditions ahead, which often causes traffic accidents; moreover, since the spray path is long, the spray area is large, and a large amount of cleaning agent is needed, a great waste of resources is caused.

SUMMARY OF THE INVENTION

Therefore, an objective of the present application is to provide a wiper arm, a wiper and a vehicle, which can at least partially solve the above-mentioned problems.

According to one aspect of the present application, a wiper arm is provided, which comprises a wiper arm body and a wiper arm end piece, the wiper arm end piece being fixedly connected to one end of the wiper arm body to hold a wiper blade, the wiper arm being further provided with a nozzle and a hose, wherein
the nozzle is connected to an extension section of the wiper arm end piece towards the return side or the outward swing side of the wiper arm;
the hose extends along the wiper arm body, and one end of the hose is connected to the nozzle to deliver a cleaning fluid to the nozzle.

According to an embodiment of the present application, the arrangement of a nozzle on the wiper arm ensures that a cleaning fluid is quickly wiped off, the driver is given a clear field of vision, and the dosage of cleaning fluid usage may also be reduced.

In some embodiments, the nozzle comprises a nozzle body, two accommodating grooves, and a hose joint, the two accommodating grooves and the hose joint protruding from one side of the nozzle body; the extension section comprises a middle section and two edge sections, the two edge sections being insertable into the two accommodating grooves, respectively; and the hose joint is connectable to the hose.

In some embodiments, the extension section extends as a whole towards the outward swing side of the wiper arm, and the notches of the two accommodating grooves face each other.

In some embodiments, the two edge sections sink relative to the middle section of the extension section, so that the upper surface of the nozzle is flush with the upper surface of the middle section.

In some embodiments, the middle section of the extension section extends towards the outward swing side of the wiper arm, and the two edge sections are bent towards the bottom side of the middle section and extend towards each other along the bottom surface of the middle section; the notches of the two accommodating grooves face away from each other.

In some embodiments, the wiper arm end piece further comprises a hook for holding a wiper blade, and the middle section of the extension section is deflected downwards towards the windshield side relative to the upper surface of the hook.

In some embodiments, a downward deflection angle of the middle section corresponds to an installation tilt angle of the windshield.

According to an embodiment of the present application, a downward deflection angle of the middle section is caused to correspond to an installation tilt angle of the windshield, so that the nozzle and the extension section block the driver's line of sight as little as possible, thereby improving driving safety.

In some embodiments, at least one of the edge sections is provided with a protrusion, and at least one of the accommodating grooves is provided with an opening for accommodating the protrusion.

According to an embodiment of the present application, the arrangement of a protrusion and an opening makes it possible to prevent is the nozzle from loosening from the extension section.

In some embodiments, after the nozzle is connected to the extension section, the hose joint is shielded by the extension section.

In some embodiments, the nozzle body is in fluid communication with the hose joint, and the nozzle body further comprises a flow channel for a cleaning fluid, the flow channel penetrating the nozzle body.

In some embodiments, the wiper arm further comprises a wiper arm seat, the wiper arm seat being rotatably connected to the other end of the wiper arm body and used for connecting a driving motor.

According to another aspect of the present application, a wiper is further provided, comprising any of the above-described wiper arms and wiper blades, wherein the wiper blade is held by the wiper arm end piece of the wiper arm.

According to another aspect of the present application, a vehicle is further provided, comprising any of the above-described wiper arms, or the above-described wiper.

BRIEF DESCRIPTION OF THE DRAWINGS

The above-described characteristics, technical features, advantages, and implementation mode of the present application will be further explained below in a definite and easy-to-understand manner by a description of preferred embodiments and with reference to the drawings, wherein.

SPECIFIC EMBODIMENTS

Embodiments of the present application will be described exemplarily below. As those skilled in the art should realize, the embodiments explained may be amended in various ways without departing from the concept of the present invention. Thus, the accompanying drawings and the description are in essence demonstrative and non-limiting. In the following text, identical drawing reference labels generally indicate functionally identical or similar elements.

According to the general idea of the present application, a wiper arm is provided, which comprises a wiper arm body and a wiper arm end piece, the wiper arm end piece being fixedly connected to one end of the wiper arm body to hold a wiper blade, the wiper arm being further provided with a nozzle and a hose, wherein the nozzle is connected to an extension section of the wiper arm end piece towards the return side or the outward swing side of the wiper arm; the hose extends along the wiper arm body, and one end of the hose is connected to the nozzle to deliver a cleaning fluid to the nozzle.

Figure 1:
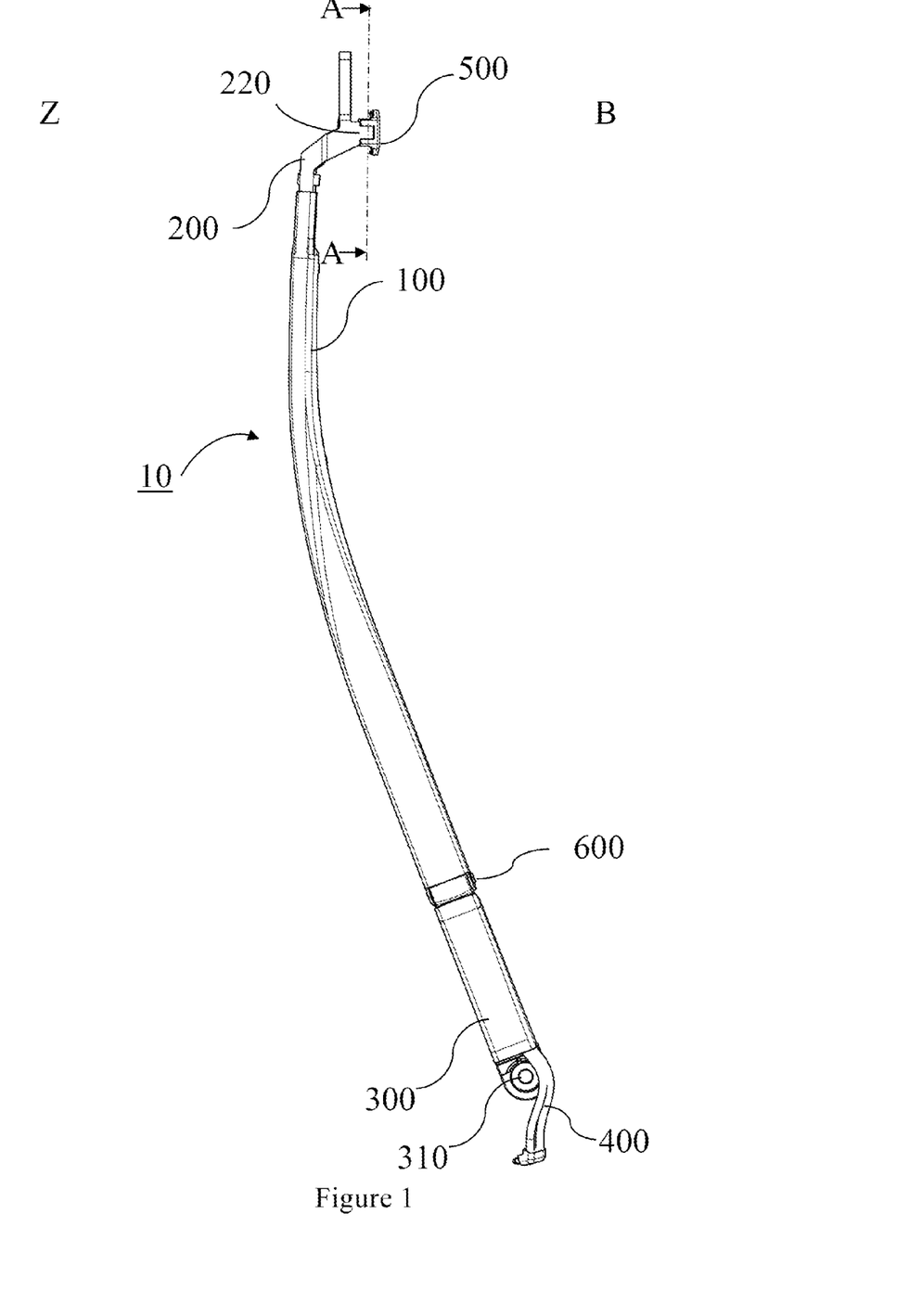
FIG. 1 is a top view of a wiper arm 10 according to an embodiment of the present application.
Figure 2:
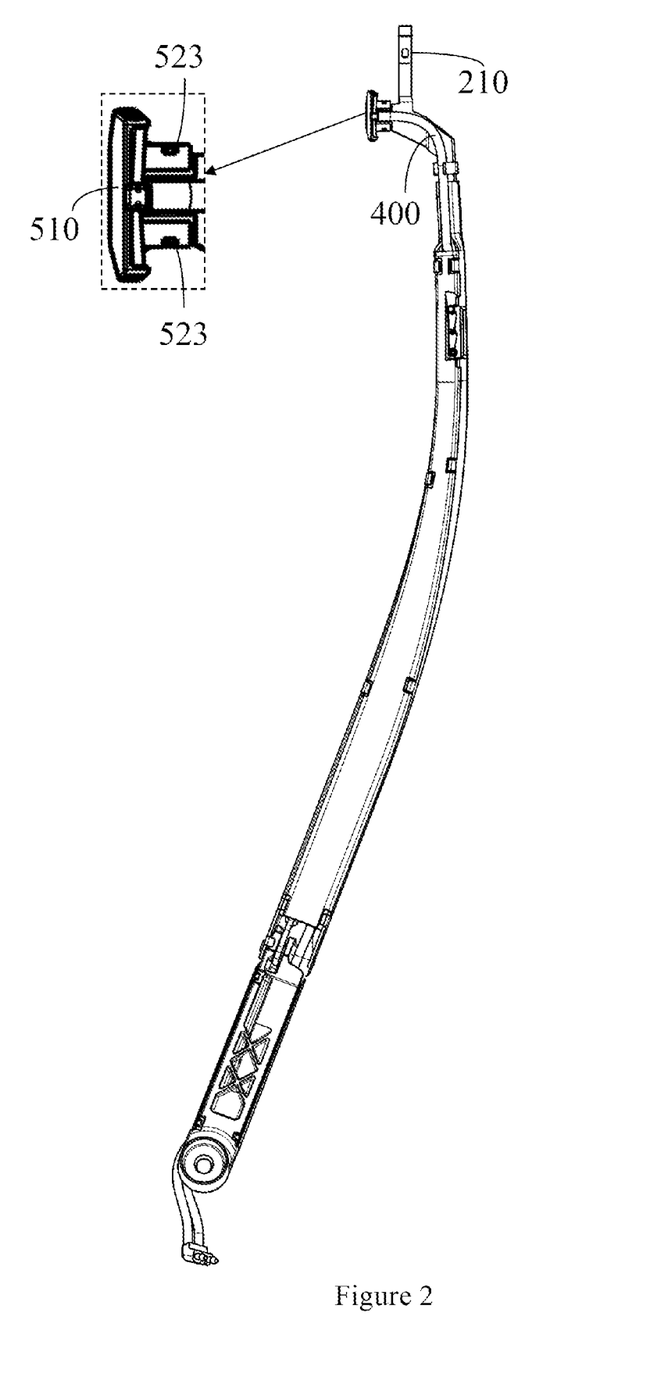
FIG. 2 is a bottom view of the wiper arm 10 in FIG. 1.

FIG. 1 shows a top view of the wiper arm 10 according to an embodiment of the present application, and FIG. 2 shows a bottom view of the wiper arm 10 in FIG. 1. As shown in FIGS. 1 and 2, the wiper arm 10 comprises a wiper arm body 100, a wiper arm end piece 200, and a wiper arm seat 300, wherein the wiper arm end piece 200 is fixedly connected to one end of the wiper arm body to hold a wiper blade; the wiper arm seat 300 is rotatably connected to the other end of the wiper arm body 100 to connect to a driving motor. In a non-restrictive example, the wiper arm end piece 200 is made by blanking and is riveted to the wiper arm body; in addition, the wiper arm end piece 200 comprises a hook 210 for holding a wiper blade. In a non-restrictive example, the wiper arm body 100 and the wiper arm seat 300 are pivotally connected by a pivot 600; in addition, the wiper arm seat 300 comprises a connecting hole 310 for connecting to the output shaft of a driving motor.

As shown in FIGS. 1 and 2, the wiper arm 10 is further provided with a hose 400 and a nozzle 500, and the hose 400 extends along the wiper arm body 100, of which one end is connectable to a cleaning fluid supply container or another supply channel connected to the supply container, and the other end is (for example, but not limited to, detachably) connected to the nozzle 500 to supply a cleaning fluid to the nozzle 500. The nozzle 500, used for spraying a cleaning fluid to a windshield, is connected to an extension section 220 of the wiper arm end piece 200, the extension section 220 is provided on the outward swing side B of the wiper arm 10, and the nozzle 500 is connected to the extension section 220 towards the return side Z. It should be noted that a wiping area of a wiper comprising the wiper arm 10 and a wiper blade on a windshield is defined by a return pause position close to the bonnet of the vehicle and a outward swing pause position away from the bonnet of the vehicle, and, correspondingly, the outward swing side B refers to the side of the wiper arm 10 close to an outward swing pause position, wherein, as shown in FIG. 1, the outward swing side B is indicated as the right side of the wiper arm 10; the return side Z refers to the side of the wiper arm 10 close to the bonnet of the vehicle, and, as shown in FIG. 1, the return side is indicated as the left side of the wiper arm 10.

Figure 3:
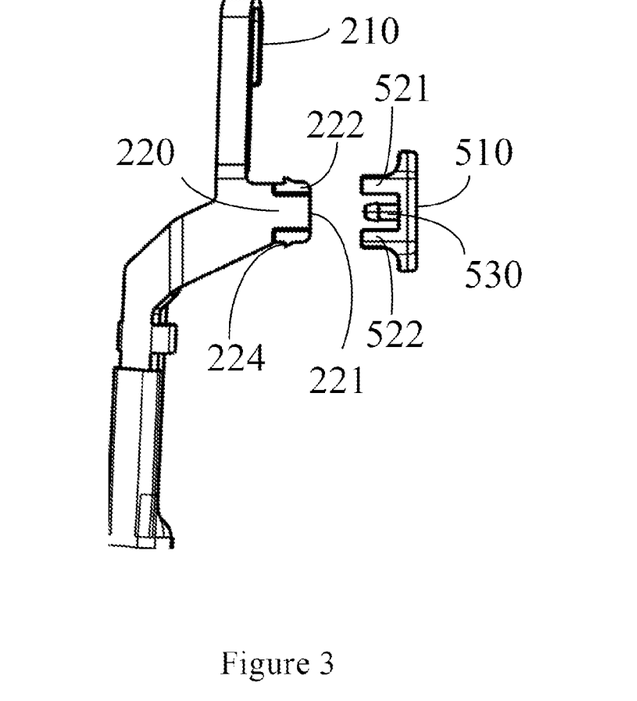
FIG. 3 is a partial top view of the wiper arm end piece 200 and the nozzle 500 of the wiper arm 10 in FIG. 1.

In an example, a snap connection is established between the nozzle 500 and the extension section 220. Specifically, as shown in FIGS. 3 and 4, the extension section 220 extends towards the outward swing side B, and comprises a middle section 221, and edge sections 222 and 223 on either side of the middle section 221; the nozzle 500 comprises a nozzle body 510, an accommodating groove 521, an accommodating groove 522, and a hose joint 530, wherein the accommodating groove 521, the accommodating groove 522, and the hose joint 530 all protrude from one side of the nozzle body 510; the notches of the accommodating groove 521 and the accommodating groove 522 face each other, and the edge section 222 and the edge section 223 of the extension section 220 are insertable into the accommodating groove 521 and the accommodating groove 522, respectively; the hose joint 530 is detachably connected to the hose 400.

Figure 4:
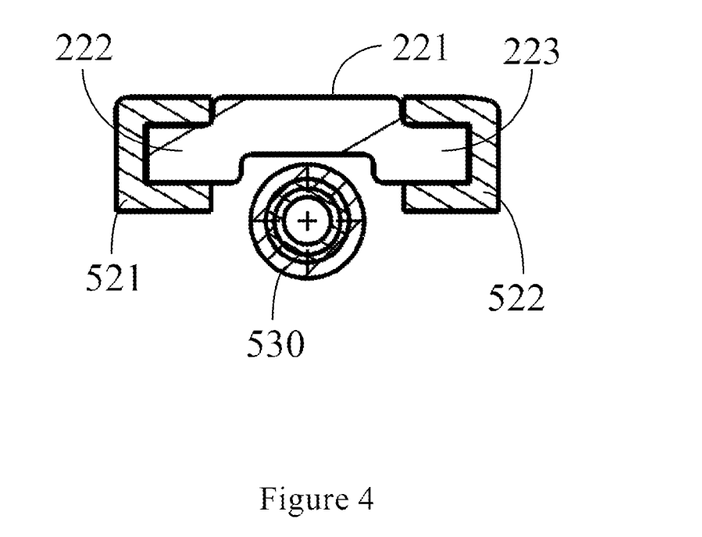
FIG. 4 is a cross-sectional view taken along the line A-A in FIG. 1.

Preferably, as shown in FIG. 4, the edge section 222 and the edge section 223 of the extension section 220 sink relative to the middle section 221, so that after the nozzle 500 is connected to the extension section 220, the upper surface of the nozzle 500 is substantially flush with the upper surface of the middle section 221, thereby improving the aesthetic appeal of the wiper arm 10.

Figure 5:
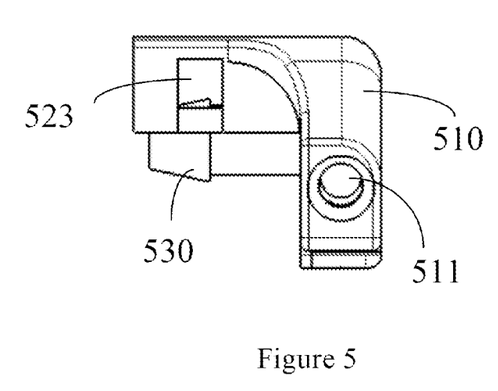
FIG. 5 is a side view of the nozzle 500 of the wiper arm 10 in FIG. 1.
Figure 6:
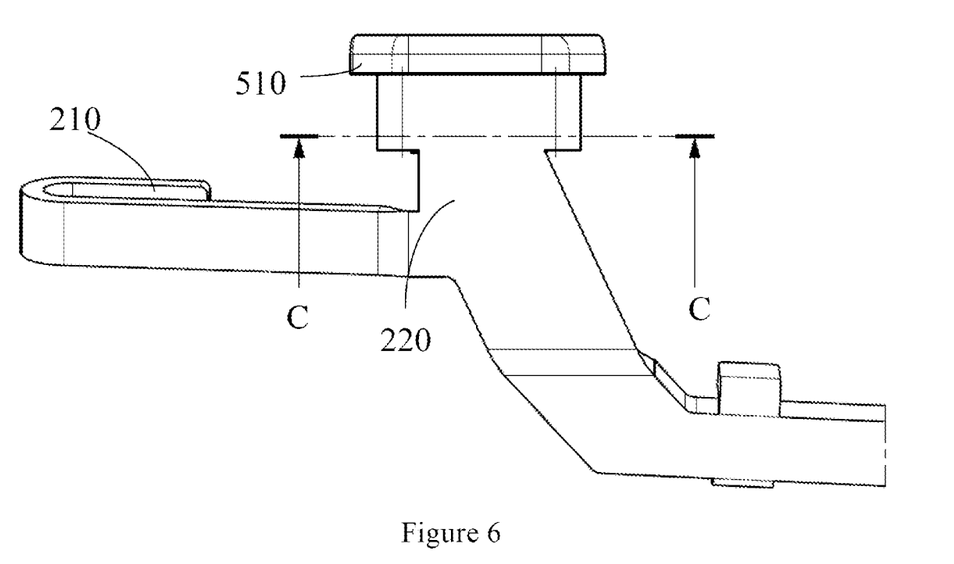
FIG. 6 is another partial top view of the wiper arm end piece 200 and the nozzle 500 according to an embodiment of the present application.

In another example, as shown in FIGS. 5 and 6, the extension section 220 comprises a middle section 221, and the edge sections 222 and 223 on either side of the middle section 221, wherein the middle section 221 extends towards the outward swing side B, while the edge sections 222 and 223 are bent towards the bottom side of the middle section 221 and extend towards each other along the bottom surface of the middle section 221; the nozzle 500 comprises a nozzle body 510, an accommodating groove 521, an accommodating groove 522, and a hose joint 530, wherein the accommodating groove 521, the accommodating groove 522, and the hose joint 530 all protrude from one side of the nozzle body 510; the notches of the accommodating groove 521 and the accommodating groove 522 face away from each other, and the edge section 222 and the edge section 223 of the extension section 220 are insertable into the accommodating groove 521 and the accommodating groove 522, respectively; the hose joint 530 is detachably connected to the hose 400.

Preferably, as shown in FIGS. 1, 4 and 6, after the nozzle 500 is snap-connected to the extension section 220, the hose joint 530 is shielded by the extension section 220, thereby improving the aesthetic appeal of the wiper arm 10.

Preferably, as shown in FIGS. 2, 3, 5, and 7, at least one of the edge section 222 and the edge section 223 is provided with a protrusion 224, correspondingly at least one of the accommodating groove 521 and the accommodating groove 522 is provided with an opening 523, and the nozzle 500 is deformable to make the protrusion 224 snap into the opening 523, thereby preventing the nozzle 500 from falling off the extension section 220 easily. Herein, the protrusion 224 may be triangular or have any other shape.

Figure 7:
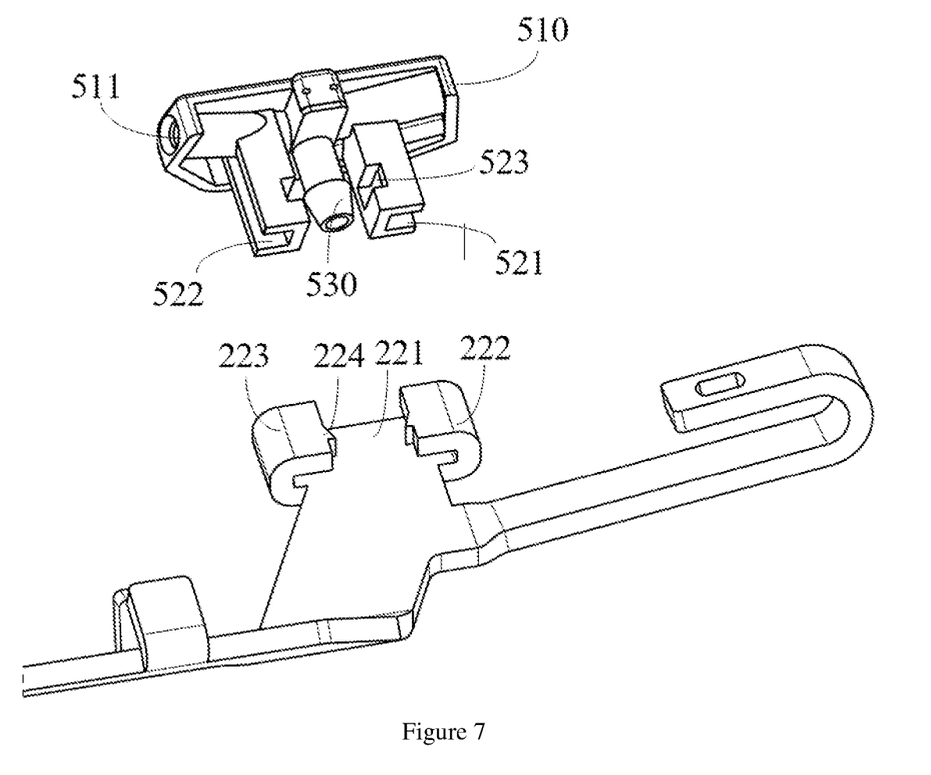
FIG. 7 is another partial bottom view of the wiper arm end piece 200 and the nozzle 500 according to an embodiment of the present application.

As shown in FIGS. 5 and 7, the nozzle body 510 may further comprise a flow channel 511 for a cleaning fluid, and the flow channel penetrates the nozzle body 510. In addition, the hose joint 530 is in fluid communication with the nozzle body 510, so that a cleaning fluid can flow into the nozzle body 510 from the hose joint.

Figure 8:
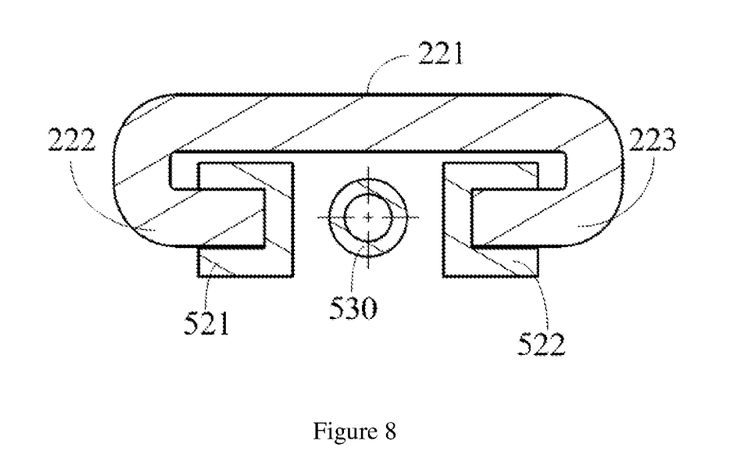
FIG. 8 is a cross-sectional view taken along line C-C in FIG. 6.
Figure 9:
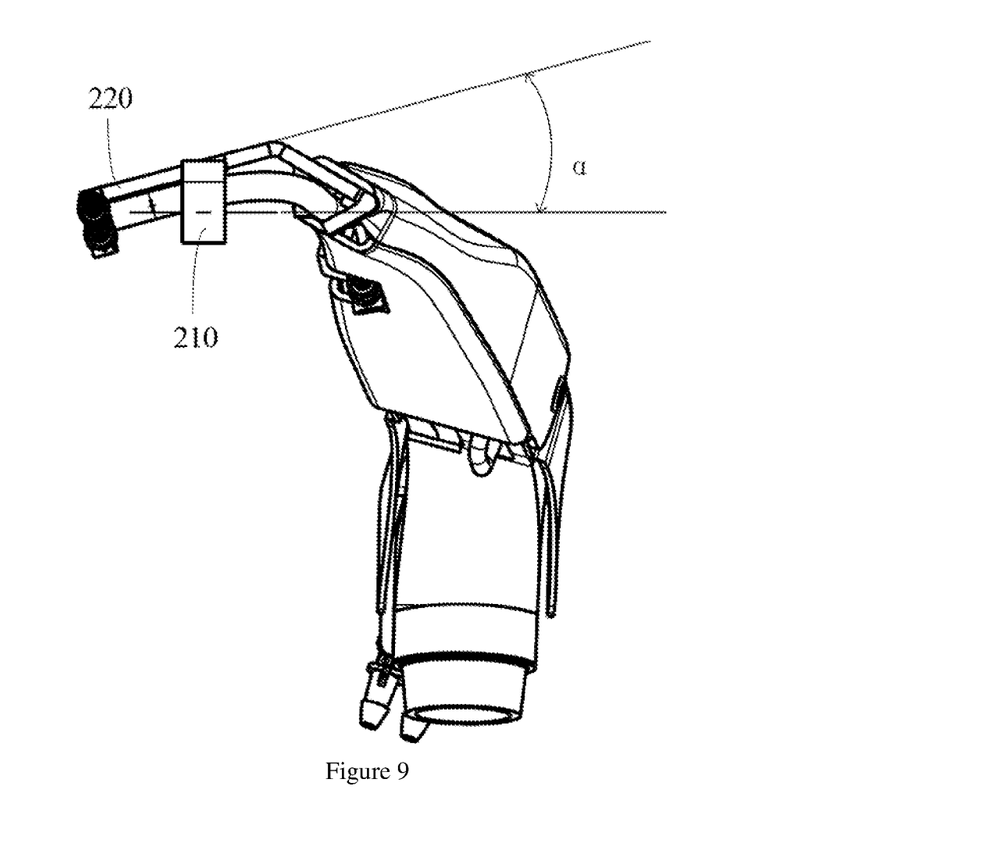
FIG. 9 is a three-dimensional schematic diagram of the wiper arm 10 according to an embodiment of the present application.

Preferably, as shown in FIG. 9, at least one part of the extension section 220 is deflected downwards by an angle α towards the windshield side relative to the upper surface of the hook 210. In the examples shown in FIGS. 3 to 5, said at least one part comprises a middle section 221 and edge sections 222 and 223, and, in the examples shown in FIGS. 6 to 8, said at least one part comprises a middle section 221. More preferably, the above-mentioned deflection angle α corresponds to an installation tilt angle of the windshield, so that when the wiper is installed on the windshield of a vehicle, in the direction of observation by a driver in the vehicle, the nozzle 500 and the extension section 220 block the driver's path of observation as little as possible, which allows a reduction of interference by the wiper to the driver to ensure driving safety.

It should be noted that although it is shown in the preceding example that the nozzle 500 and the extension section 220 are located on the outward swing side B of the wiper arm 10, and that the nozzle 500 is connected to the extension section 220 towards the return side Z, it is understandable that the nozzle 500 and the extension section 220 may also be located on the return side Z of the wiper arm 10, and that the nozzle 500 is connected to the extension section 220 towards the outward swing side B.

According to an embodiment of the present application, the arrangement of a nozzle on the wiper arm ensures that a cleaning fluid is quickly wiped off, the driver is given a clear field of vision, and the cleaning fluid usage may also be reduced.

According to another aspect of the present application, it further relates to a wiper, comprising a wiper arm 10 as described above and a wiper blade, wherein the wiper blade is held by the wiper arm end piece 200 of the wiper arm 10.

According to yet another aspect of the present application, it further relates to a vehicle, comprising a wiper arm 10 as described above, or a wiper as described above.

The present application, instead of being limited to the above-described structures, may also have other variants. Although the present invention has already been described by means of a limited number of embodiments, those skilled in the art could, drawing benefit from this disclosure, design other embodiments which do not depart from the scope of protection of the present invention disclosed herein. Thus, the scope of protection of the present invention should be defined by the attached claims alone.

The invention claimed is:

1. A wiper arm, comprising:
   a wiper arm body; and
   a wiper arm end piece, the wiper arm end piece being fixedly connected to one end of the wiper arm body to hold a wiper blade; and
   a nozzle and a hose, wherein the nozzle is connected to an extension section of the wiper arm end piece towards a return side or an outward swing side of the wiper arm, and
   wherein the hose extends along the wiper arm body, and one end of the hose is connected to the nozzle to deliver a cleaning fluid to the nozzle, wherein the nozzle comprises:
   a nozzle body, two accommodating grooves with notches, and
   a hose joint connectable to the hose;
   the two accommodating grooves and the hose joint protruding from one side of the nozzle body;
   wherein the extension section comprises a middle section and two edge sections insertable into the two accommodating grooves;
   wherein the middle section of the extension section extends towards the outward swing side of the wiper arm; and
   the two edge sections are bent towards a bottom side of the middle section and extend towards each other along a bottom surface of the middle section, where the notches of the two accommodating grooves face away from each other.

2. The wiper arm of claim 1, wherein the wiper arm end piece further includes a hook for holding the wiper blade, and the middle section is deflected downwards towards a windshield side relative to an upper surface of the hook.

3. The wiper arm of claim 2, wherein a deflection angle [α] of the middle section corresponds to a tilt angle of a windshield on which the wiper arm is installed.

4. The wiper arm of claim 1, wherein at least one of the edge sections is provided with a protrusion, and at least one of the accommodating grooves is provided with an opening for accommodating the protrusion.

5. The wiper arm of claim 1, wherein after the nozzle is connected to the extension section, the hose joint is shielded by the extension section.

6. The wiper arm of claim 1, wherein the nozzle body is in fluidic communication with the hose joint, and
   the nozzle body further includes a flow channel for a cleaning fluid, the flow channel penetrating the nozzle body.

7. A wiper, comprising:
   a wiper arm according to claim 1; and
   a wiper blade, wherein the wiper blade is held by the wiper arm end piece of the wiper arm.

8. A vehicle, comprising a wiper according to claim 7.

* * * * *